(12) United States Patent
Sigwart et al.

(10) Patent No.: US 6,441,110 B1
(45) Date of Patent: Aug. 27, 2002

US006441110B1

(54) METHOD FOR PRODUCING HALOGEN-FREE REACTIVE POLYISOBUTENE

(75) Inventors: Christoph Sigwart, Schriesheim; Thomas Narbeshuber; Karsten Eller, both of Ludwigshafen; Manfred Barl, Eisenberg; Rolf Fischer, Heidelberg; Eugen Gehrer, Ludwigshafen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/367,194

(22) PCT Filed: Jan. 17, 1998

(86) PCT No.: PCT/EP98/00240
§ 371 (c)(1),
(2), (4) Date: Aug. 6, 1999

(87) PCT Pub. No.: WO98/34966
PCT Pub. Date: Aug. 13, 1998

(30) Foreign Application Priority Data

Feb. 6, 1997 (DE) .......................... 197 04 482

(51) Int. Cl.⁷ .............................. C08F 4/24; C08F 10/10
(52) U.S. Cl. ................... 526/104; 526/95; 526/101; 526/103; 526/106; 526/107; 526/130; 526/172; 526/348.7
(58) Field of Search .................. 526/95, 104, 130, 526/154, 172, 348.7, 101, 103, 106, 107

(56) References Cited

U.S. PATENT DOCUMENTS

| | | | |
|---|---|---|---|
| 3,405,191 A | 10/1968 | Banks | 260/677 |
| 4,152,499 A | 5/1979 | Boerzel et al. | 526/52.4 |
| 4,288,649 A | 9/1981 | McCaulay | 585/533 |
| 4,605,808 A | 8/1986 | Samson | 585/528 |
| 4,832,702 A | 5/1989 | Kummer et al. | 44/62 |
| 5,286,823 A | 2/1994 | Rath | 526/237 |
| 5,310,712 A | 5/1994 | Funk et al. | 502/9 |
| 5,326,920 A | 7/1994 | Ho et al. | 585/528 |
| 5,710,225 A | 1/1998 | Johnson et al. | 526/172 |
| 6,133,386 A | * 10/2000 | Morrell et al. | 526/172 X |

FOREIGN PATENT DOCUMENTS

| | | |
|---|---|---|
| DE | A-2702604 | 7/1978 |
| DE | A-195 28 942.0 | 7/1997 |
| EP | A-145235 | 8/1983 |
| EP | A-244616 | 11/1987 |
| EP | A-535516 | 4/1993 |
| EP | WO 94/28036 | 12/1994 |
| GB | A-1115521 | 5/1968 |
| JP | A-139429 | 10/1981 |
| NL | A-7002055 | 8/1971 |
| WO | WO-95/26814 | 10/1995 |
| WO | WO-95/26815 | 10/1995 |
| WO | WO-95/26816 | 10/1995 |
| WO | WO-95/26818 | 10/1995 |

OTHER PUBLICATIONS

H. Guterbock, Polyisobutlen und Isobutylen–Mischpolymerisate, pp. 74–104. Springer–Verlag, Berlin, 1959.
Khodakov et al, Izv. Akad. Nauk SSR, Ser. Khim. (1981), (8), 1724–8; with translation: Bull.Acad. Sci., USSR, Div. Chem. Sci. 30, 1395 (1982).

* cited by examiner

Primary Examiner—Fred Teskin
(74) Attorney, Agent, or Firm—Keil & Weinkauf

(57) ABSTRACT

A process for preparing halogen-free, reactive polyisobutene having a terminal double bond content of more than 50 mol % and an average molecular weight $M_n$ of 280–10000 dalton by the cationic polymerization in the liquid phase of isobutene or hydrocarbon mixtures comprising isobutene comprises polymerizing at from −30° C. to +40° C. in the presence of a heterogeneous polymerisation catalyst comprising one or more oxides of the elements of transition groups V and VI of the Periodic Table of the Elements or in the presence of a heterogeneous polymerization catalyst comprising one or more oxidic compounds of one or more elements of transition groups V and VI of the Periodic Table of the Elements supported on a non-zeolitic oxidic support material which is not an oxygen-containing zirconium compound, the catalyst not containing a technically effective amount of halogen.

7 Claims, No Drawings

METHOD FOR PRODUCING HALOGEN-FREE REACTIVE POLYISOBUTENE

The present invention relates to a process for preparing halogen-free, reactive polyisobutene;having a terminal double bond content of more than 50 mol % and an average molecular weight A $M_n$ of 280–10000 dalton by the cationic polymerization in the liquid phase of isobutene or hydrocarbon mixtures containing the isobutene.

The polymerization of isobutene yields an inseparable mixture of polyisobutenes, in which the position of the double bond varies between the individual polyisobutenes. Polyisobutenes of formula

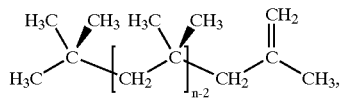

I wherein n is the degree of polymerization which in turn is derived from the average molecular weight $M_n$ of the polyisobutene prepared, contain terminal C—C double bonds of the vinylidene type which are herein also referred to as α-olefinic double bonds owing to their position in the polyisobutene molecule. Accordingly, the double bonds in polyisobutenes of formula II

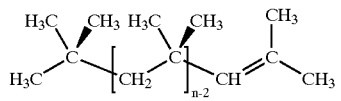

II are referred to as β-olefinic. If the polymerization of isobutene is carried out without taking special measures, a random mixture is formed which comprises polyisobutenes having α-olefinic, i.e. terminal, double bonds, β-olefinic double bonds and double bonds located further toward the interior of the polyisobutene molecule. The terminal double bond content and the β-olefinic double bond content of a polyisobutene product prepared by a particular process are both reported in mol %.

Polyisobutenes having molecular weights of up to 100000 dalton are known. These olefins are usually prepared by Lewis acid-catalyzed isobutene polymerization employing aluminum chloride, alkylaluminum chloride or boron trifluoride as Lewis acids, as described, for example, in H. Guterbock, Polyisobutylene und Mischpolymerizate, p. 77–104, Springer Verlag, Berlin, 1959. However, the resulting polymers have a relatively low vinylidene type terminal C—C double bond content of less than 10 mol %.

In contrast, reactive polyisobutene (PIB) having molecular weights of usually 500–5000 dalton has a high terminal vinylidene group content of, preferably, more than 50 mol %. These reactive polyisobutenes are used as intermediates in the preparation of lubricant and motor fuel additives as described, for example, in DE-A 27 02 604 (see U.S. Pat. No. 4,152,499). These additives are prepared by initially reacting polyisobutene with maleic anhydride. The preferred reactive sites for this reaction are the terminal double bonds of the vinylidene type, whereas double bonds located further toward the interior of the macromolecule react to a lesser extent if at all, depending on their position in the molecule. The polyisobutene/maleic anhydride adducts formed are then reacted with certain amines to give the corresponding additives. It is therefore absolutely necessary for polyisobutenes used as starting materials for the abovementioned additives to have a high terminal double bond content. The same applies to the preparation of the polyisobuteneamines of EP-A 244 616 (see U.S. Pat. No. 4,832,702) which are also used as motor fuel additives and which are prepared by hydroformylation of the reactive polyisobutene and subsequent reductive amination of the resulting polyisobutene aldehyde. For this process, preference is likewise given to using polyisobutene having a high terminal double bond content, but β-olefinic polyisobutenes also give the desired product when the hydroformylation is carried out using cobalt catalysts, owing to their double bond isomerization activity.

The preparation of reactive polyisobutene by homogeneously catalyzed polymerization of isobutene is already known. According to DE-A 27 02 604, for example, a polyisobutene product having a terminal double bond content of up to 88% is obtained by reacting isobutene in the presence of boron trifluoride. EP-A 145 235 (see U.S. Pat. No. 4,605,808) teaches the polymerization of isobutene in the presence of a complex of boron trifluoride and a primary alcohol at from −100° C. to +50° C. to give products with similarly high vinylidene double bond contents. According to U.S. Pat. No. 5,286,823, highly reactive polyisobutene can also be prepared using complexes of boron trifluoride and secondary alcohols as catalysts.

The disadvantages of this homogeneously catalyzed process are that the Lewis acid catalysts used are corrosive and that there is a risk that, apart from the desired reactive polyisobutene, halogenated polymeric byproducts are formed which are virtually inseparable from PIB and adversely affect the product and processing characteristics of the PIB. In these processes, the homogeneous catalyst is usually separated by quenching with a nucleophile to destroy the catalyst and subsequently removing the PIB from the quenching mixture by extraction. These additional workup steps are a further disadvantage of the homogeneously catalyzed PIB preparation process.

WO 94/28036 discloses, inter alia, the preparation of polyisobutene using heterogeneous Lewis acid-like catalysts.

Catalysts used are salts of elements of transition groups III, IV, V and VI of the Periodic Table of the Elements, which salts are insoluble in the reaction medium, preferably halides, sulfates, perchlorates, trifluoromethanesulfonates, nitrates and fluorosulfonates thereof. In the examples of this application, only the halides of these elements are used as catalysts for isobutene polymerization. No information is given about the properties of the polyisobutene obtained in these examples in terms of their molecular weight or their terminal double bond content. The polymerization is terminated by adding methanolic ammonia solution to the reaction medium to destroy or at least substantially inactivate the catalysts in question.

The preparation of PIB using heterogeneous catalysts is also known. U.S. Pat. No. 4,288,649 describes a process for preparing polyisobutene having an average molecular weight of >1250 dalton by polymerizing $C_4$ hydrocarbon mixtures comprising isobutene over halided alumina catalysts. These catalysts are prepared by treating the alumina with a haliding agent, preferably with a chloriding agent, in particular with carbon tetrachloride, at an elevated temperature. The disadvantage of this process is that some of the chlorine is transferred from the catalyst to the polymer which forms. For example, the polymerization of a mixture of n-butane, isobutane and isobutene over a chlorided alumina catalyst prepared in this manner gives, after a reaction time of 2 hours, a polyisobutene product having a chlorine content of 46 ppm.

U.S. Pat. No. 5,326,920 discloses a process for polymerizing isobutene by employing as heterogeneous catalyst an oxidic support material, preferably silica, which has been activated with a metal chloride attached thereto, preferably with an aluminum chloride. Particular preference is given therein to an $SiO_2$—$AlCl_2$ catalyst in which $AlCl_2$ groups are anchored on the $SiO_2$ support via oxygen linkages. The disadvantages of this process are that the polyisobutene products obtained have an extremely broad molecular weight distribution D of from 8 to 14, a low terminal double bond content and a chlorine content in the ppm range. Furthermore, this process requires the presence of promoters such as water, alcohols, alkyl halides or hydrogen chloride to achieve a catalyst activity which is sufficient for industrial operation. Similar catalyst systems for the polymerization of isobutene are described in WO 95/26815, WO 95/26816, WO 95/26814 and WO 96/26818.

JP-A 139 429/1981 utilizes heterogeneous zirconium dioxide and molybdenum oxide catalysts to prepare isobutene oligomers having a molecular weight of less than 300 dalton. These catalysts can be mixed with aluminum fluoride to increase their activity. According to this publication, the reaction of an isobutene-comprising $C_4$ cut (composition: 46% of isobutene, 28% of 1-butene, 8% of 2-butenes, 12% of n-butane, 5% of isobutane, 1% of 1,3-butadiene) over an $MoO_3/ZrO_2$ catalyst having a molybdenum content, calculated as $MoO_3$, of 13% by weight at 120° C. yields an isobutene oligomer mixture comprising 29% of diisobutene, 49% of triisobutene and 19% of tetraisobutene.

NL-A 7 002 055 discloses a process for preparing isobutene oligomers in the gas phase using a tin oxide/molybdenum oxide on silica catalyst to give a mixture of isobutene dimers, trimers and tetramers.

EP-A 535 516 (see U.S. Pat. No. 5,310,712) discloses a catalyst for the preparation of ethylene polymers comprising chromium trioxide on a particular $SiO_2$ support material. This publication does not teach the preparation of reactive, low molecular weight polyisobutene.

GB-A 1 115 521 discloses, inter alia, the polymerization of isobutene over a Na-X zeolite loaded with a platinum compound. This yields essentially dimers and trimers of isobutene along with minor amounts of tetramers and higher polymers. No information is given about the molecular weight of the higher polymers thus formed and their terminal double bond content.

The unpublished application PCT/EP 96/03441 discloses a process for preparing low molecular weight, reactive and halogen-free polyisobutene utilizing, as a catalyst, a support material comprising an oxygen-containing zirconium compound and doped with various promoters.

It is an object of the present invention to find a process for preparing halogen-free, reactive polyisobutene having a terminal double bond content of more than 50 mol %, a terminal double bond and β-olefinic double bond content of more than 80 mol % and an average molecular weight of 280–10000 dalton using a heterogeneous catalyst. Another object of the present invention is to find heterogeneous catalysts which are suitable for this process and which make it possible to operate the process for preparing polyisobutene in an economical manner.

We have found that these objects are achieved by a process for preparing halogen-free, reactive polyisobutene having a terminal double bond content of more than 50 mol % and an average molecular weight $M_n$ of 280–10000 dalton by the cationic polymerization in the liquid phase of isobutene or hydrocarbon mixtures comprising isobutene, which comprises polymerizing at from −30° C. to +40° C. in the presence of a heterogeneous polymerization catalyst comprising one or more oxides of the elements of transition groups Vb and VIb of the Periodic Table of the Elements or in the presence of a heterogeneous polymerization catalyst comprising one or more oxidic compounds of one or more elements of transition groups Vh and VIh of the Periodic Table of the Elements supported on a non-zeolitic oxidic support material which is not an oxygen-containing zirconium compound, the catalyst not containing a technically effective amount of halogen.

In contrast to the undoped oxides of the individual support materials which are virtually inactive as catalysts for the polymerization of isobutene or only have a very low catalytic activity, the catalysts to be used according to the invention have a good or very good activity and selectivity for the polymerization of isobutene to give reactive, low molecular weight polyisobutene having a terminal double bond content of more than 50 mol % and an average molecular weight of 280–10000 dalton. Since it is not necessary to add halogenated compounds to the catalysts to be used according to the invention to achieve a high activity and selectivity, these catalysts provide an economical way to prepare halogen-free PIB.

Since both the method of preparing the catalysts to be used according to the invention and the chemical and physical analytical data of these catalysts suggest that the support material present in these catalysts is in the form of oxidic compounds of the individual support components, use is being made in the present application, for simplicity, of the terms oxidic support material or individual oxides of these support materials or the support components which constitute the support material. For the purposes of the present invention, zeolites or materials having zeolite-like properties, such as silicon aluminum phosphates (SAPOS), silicatic mesoporous materials or clays, such as bentonites, montmorillonites, kaolin, which are collectively "termed zeolitic materials" in the present application, are not regarded as oxidic support materials.

The polymerization catalysts used in the process of the invention are heterogeneous catalysts comprising, as catalytically active components, oxygen-containing compounds of one or more elements of transition group VD and/or VIb of the Periodic Table of the Elements. The catalysts which may be used according to the invention can be subdivided into two catalyst types. Catalysts of type (A) are unsupported catalysts, i.e. catalysts which are composed of oxides of one or more of the elements of transition group Vb and/or VIb of the Periodic Table of the Elements and which contain no or virtually no support materials. The catalysts of type (B) belong to the class of supported catalysts and comprise, as catalytically active component(s), one or more oxidic compounds of one or more elements of transition group Vb and/or VIb of the Periodic Table of the Elements supported on an oxidic A; support material which is not an oxygen-containing zirconium compound, these supported catalysts not containing technically effective amounts of halogen. These catalytically active components are also called promoters herein.

Advantageous catalysts of type (A) are the oxides of chromium, molybdenum, tungsten, vanadium, niobium or tantalum or mixtures of two or more of these oxides, in the form of powders or shaped articles, such as extrudates, spheres, rings or spirals. Preferred catalysts of type (A) are the oxides of chromium, molybdenum, tungsten and vanadium or mixtures of two or more of these oxides or mixtures of one or more of these oxides with niobium oxide ($Nb_2O_5$) or tantalum oxide ($Ta_2O_5$). Of the various oxides of different oxidation state which the elements of transition groups V and VI may form, preference is given to using chromium (IV) oxide ($CrO_2$), chromium (III) oxide ($Cr_2O_3$), molybdenum (VI) oxide ($MoO_3$), tungsten (VI) oxide ($WO_3$), vanadium pentoxide ($V_2O_5$), niobium pentoxide ($Nb_2O_5$) and tantalum pentoxide ($Ta_2O_5$) as catalysts for the process of the invention. These oxides may be prepared in a conventional manner, for example by calcining in an oxygen-containing atmosphere of, for example, ammonium chromate (($NH_4)_2CrO_4$), ammonium molybdate (($NH_4)_2MoO_4$), ammonium tungstate (($NH_4)_2WO_4$), ammonium vanadate ($NH_4VO_3$), ammonium niobate ($NH_4NbO_3$) or ammonium tantalate ($NH_4TaO_3$). As a result of this preparation method, the oxides thus obtained may also contain small amounts of oxides of lower or possibly higher oxidation states of these elements.

Oxidic support materials for the catalysts of type (B) are the solid, heat-resistant oxides of the elements of main groups IIb, IIIb and IVb of the Periodic Table of the Elements and of the Elements of transition groups I, II, III and IV (excluding zirconium), VII and VIII, the elements of transition group III including the rare earth metals. As will be described elsewhere herein in more detail, these oxides may be present in the support material, as a result of their preparation, in the form of defined oxides of stoichiometric composition, in the form of non-stoichiometric oxidic compounds, in the form of mixed-valency oxides or, when a support material comprising a plurality of elements of the abovementioned groups of the Periodic Table of the Elements are used, in the form of mixed oxides of the relevant elements, in which case, again as a result of the preparation method, the support in question may contain individual types of these oxide forms virtually exclusively, but also different oxide forms simultaneously. For the purposes of the present application, heat-resistant oxides are those of the abovementioned oxide forms which are formed under the individual calcination conditions used for the preparation of the individual catalysts or are stable under these conditions.

Of the oxides of main group II of the Periodic Table of the Elements, for example, preference is given to using the oxides of beryllium, magnesium and calcium as support material. Preferred support materials from main group III are the oxides of boron, aluminum and gallium. Suitable support materials from main group IV are the oxides of silicon, germanium, tin and lead, preference being given to the oxides of silicon ($SiO_2$), tin and lead, preferred support materials of the various oxides of tin and lead being in particular tin dioxide ($SnO_2$), lead(II) oxide (PbO), lead dioxide ($PbO_2$) and minium ($Pb_3O_4$).

It is also possible to use the oxides of the elements of transition group I of the Periodic Table of the Elements as support materials for the catalysts which may be used according to the invention, but preference is given to the oxides of copper and in particular copper (II) oxide (CuO). The preferred oxidic support material of transition group II of the Periodic Table of the Elements is zinc oxide (ZnO). Suitable oxides of transition group IV of the Periodic Table of the Elements for use as support materials are titanium dioxide ($TiO_2$) and hafnium dioxide ($HfO_2$), preference being given to titanium dioxide. Of the oxides of transition group VII of the Periodic Table of the Elements, the oxides of manganese are preferably used as support material, particularly preferably manganese dioxide ($MnO_2$) and manganese (III) oxide ($Mn_2O_3$), and preferred support materials of the oxides of the elements of transition group VIII are the oxides of iron, nickel and cobalt, in particular the iron oxides $Fe_2O_3$ and $Fe_3O_4$.

All the oxides of the elements of transition group III of the Periodic Table of the Elements including the rare earth metals can be used advantageously as support material for the catalysts which may be used according to the invention, preference being given to scandium oxide ($Sc_2O_3$), yttrium oxide ($Y_2O_3$), lanthanum oxide ($La_2O_3$), cerium (III) oxide ($Ce_2O_3$), samarium (III) oxide ($Sm_2O_3$) and ytterbium oxide ($Yb_2O_3$).

Particularly preferred support materials of the catalysts to be used according to the invention are boron trioxides, aluminum oxides, lanthanum oxides, titanium oxides, silicon dioxides, lead oxides and iron oxides including their various crystal modifications, in particular iron (III) oxide ($Fe_2O_3$) and $SiO_2$. It is also advantageous to use mixtures of two or more of these oxidic support materials as support for the catalysts to be used according to the invention.

The supported catalysts to be used according to the invention can be made in various ways by conventional methods, for example by impregnating the support material with a solution, preferably an aqueous solution, of a precursor compound for the relevant promoters), where, in the case of doping the support with a plurality of promoters, these promoters may be applied to the support material simultaneously in one impregnating step or individually, successively, in a plurality of impregnating steps, by coprecipitation of the precursor compounds for the support material and the promoter or by cosolvatation, i.e. by simultaneous dissolution of these precursor compounds in a solvent, preferably water, and evaporation of the resulting solution, followed by drying and calcining the resulting solids to give the catalysts which may be used according to the invention.

When the catalysts are prepared by impregnation, either the prefabricated support material, i.e. the relevant oxide or a mixture of a plurality of the suitable oxides, or a precursor compound for the support material which is sparingly soluble in the relevant solvent and can be converted into the support material by thermal treatment, e.g. a hydroxide, a carbonate, a nitrate or an organic salt of the support component, is impregnated with a solution, preferably an aqueous solution, of a precursor compound for the relevant promoter(s) at generally from 20 to 80° C., the impregnated support material or precursor compound for the support material is dried and the impregnated and dried support material or its precursor compound is then calcined at temperatures at which the promoter precursor compound and, optionally, the precursor compound for the support material, is/are used, are decomposed to give the catalytically active promoter or the oxidic support material, respectively, and the finished catalyst is formed.

When the catalysts of the invention are prepared by precipitation of precursor compounds for the support material and/of the promoter, a conventional precipitation method can be used. This generally involves precipitating solutions of water-soluble salts of the support component and/or the promoter by addition of a precipitating agent. Examples of precipitating agents used are bases, such as alkali metal hydroxides and carbonates or aqueous ammonia solutions, which form sparingly soluble compounds with the relevant salts of the support component. Preferred precipitating agents are alkali metal carbonates. The choice of base depends on the support component elements to be precipitated in each particular case. Depending on the type of support component to be precipitated, it may be necessary to conduct the precipitation under a pH control in a certain pH range, since some of the elements suitable as support component have amphoteric properties and/or may form soluble complex compounds with the precipitating agent. It will be appreciated that, depending on the type of support component or promoter precursor compound to be precipitated, it is also possible to use other precipitating agents as the abovementioned bases, if the anions of these precipitating agents can form sparingly soluble compounds with the relevant elements of the support component or promoter precursor compound. For example, it is possible to use solutions of water-soluble salts of elements of the support component, e.g. alkali metal silicates such as water glass or alkali metal borates such as borax, for the precipitation of the relevant promoter precursor compound, it generally being advantageous to conduct such a precipitation in a certain pH range. The resulting precipitates are advantageously separated from the liquid, washed until free from salt, dried and calcined.

It may also be advantageous to precipitate only the support component by one of the abovementioned methods in a precipitation reaction and to mix the resulting precursor for the support material, e.g. with an oxide or a precursor compound for the promoter, followed by drying and subsequent calcining to produce the catalyst. It is also possible to precipitate the promoter precursor compound onto the support material initially charged in the precipitation vessel followed by workup of the resulting material as described above to produce the catalyst. It is particularly advantageous to precipitate the precursor compounds for the support material and the promoter in separate precipitations, followed by mixing of the resulting precipitates, e.g. in a kneader or extruder, and conversion into the catalyst in a similar manner.

Instead of precipitating the catalysts to be used according to the invention, they can also be produced by cosolvation of precursor compounds for the support material and the promoter, evaporating off this solution and drying and calcining of the resulting residue.

In addition to the above-described wet chemical methods, the promoter precursor compounds may also be deposited on the support material or a precursor compound for the support material, for example, by vapor deposition of the promoter elements or promoter element compounds or by flame-spraying. Calcination in an oxygen-containing atmosphere then gives the catalysts to be used according to the invention.

The catalyst precursors obtained by impregnation, precipitation or cosolvation are generally dried at from 50° C. to 300° C., preferably at from 60° C. to 200° C., particularly preferably at from 70° C. to 150° C. By drying under reduced pressure, it is possible to accelerate the drying process or to use a drying temperature lower than the stated values.

The dried catalyst precursors or the catalyst precursors obtained by vapor deposition or flame-spraying are generally calcined in an oxidizing atmosphere, in particular in the presence of oxygen-containing gases, preferably in air. The calcination temperature is generally more than 300° C. to 1000° C., preferably more than 300° C. to 800° C., particularly preferably more than 300° C. to 700° C. Depending on the type, preparation method and composition of the relevant catalyst precursor, the calcination time is generally from 1 to 20 hours.

During calcination in an oxidizing atmosphere, the dried catalyst precursors obtained by the preparation method used in the particular case (impregnation, precipitation, cosolvatation, vapor deposition or flame-spraying) are converted into the catalysts, the precursor compounds for the support material and/or the promoter contained therein being thermally decomposed or oxidized to the corresponding oxidic compounds. Examples of precursor compounds are thermally or oxidatively decomposable salts, when the impregnation method is used, sparingly soluble hydroxides, carbonates, basic salts, oxyhydroxides, silicates or borates, when the precipitation method is used, and the relevant oxidizable elements, when the vapor deposition method or the flame-spraying method is used. Depending on the type, composition and preparation method of the catalyst precursor, the calcination conditions used lead to the decomposition of thermally or oxidatively decomposable salts, e.g. to give the relevant oxides, mixed-valency oxides and/or mixed oxides, to a conversion of the precipitates obtained by precipitation and subsequent drying, e.g. into the relevant stoichiometric or non-stoichiometric oxidic compounds, mixed-valency oxides and/or mixed oxides, and to the oxidation of the elements deposited on the support material or a support material precursor by vapor deposition to give the corresponding oxides. Consecutive reactions may also occur in the case of the calcination. These involve, for example, the reaction of oxides initially formed from the promoter precursor with the oxidic support material in a solid phase reaction to give mixed oxides or the conversion of relatively high oxidation state promoter compounds or support components on the catalyst surface with relatively low oxidation state promoter or support components present in the interior of the catalyst particle in a solid phase reaction to give mixed-valency or non-stoichiometric oxides. Accordingly, depending on the type and composition of the support and promoter components and their precursors, the preparation method of the catalyst precursor and the calcination conditions used, individual types of the above-described oxide forms may predominate over the other oxide forms in the finished catalyst, or various types of these oxide forms may be present simultaneously.

It will therefore be appreciated that the calcination conditions for each individual catalyst must be chosen according to its composition, the manner in which the promoter elements have been deposited on the support material or its precursor and the type of the compounds of the promoter elements used for this purpose, if optimum results are to be achieved in the process according to the invention. The individual choice of these calcination conditions within the range of the abovementioned calcination temperatures and calcination time can be easily made by a person skilled in the art by means of a few routine experiments.

The above-described preparation methods for the catalysts are only illustrative and can be varied, if desired. Which one of the abovementioned methods for preparing the catalysts for type (B) is used, is generally not critical for the effectiveness of these atalysts in the process according to the invention. The choice of a particular preparation method generally depends on the availability of particular starting materials for the relevant promoters and support materials, the availability of the equipment required for the operation methods, the composition of the desired catalysts and the chemical behavior known from text books of the starting materials available for the preparation of the relevant catalysts under the conditions of the various preparation methods.

Apart from their elemental composition, the exact chemical structure of the catalysts to be used according to the invention is virtually unknown for the abovementioned reasons. It is possible that the promoter elements from transition group V and/or VI of the Periodic Table of the Elements and the oxidic support material form mixed oxides or mixed-valency oxides which form catalytically active centers and thus catalyze the isobutene polymerization, but it is also possible that the promoter elements are attached to the surface of the support material by chemical bonds, for example via oxygen linkages, and thus cause the catalytic activity of the doped support materials which exhibit virtually no catalytic activity in the process according to the invention without such doping. It is therefore impossible to specify the mode of action of these catalysts: when the acidity of the catalysts which may be used according to the invention is determined by Hammett titration, some prove to be strong acids using this method of titration, whereas others are virtually neutral but still catalyze the isobutene polymerization resulting in the desired high terminal double bond content.

Since the exact chemical structure of the catalysts to be used according to the invention is unknown, the individual catalysts are characterized by their support element and promoter element content in % by weight, calculated as the relevant support element or promoter element, respectively, based on the total weight of the calcined catalyst. The remainder to 100% by weight is mainly contributed by the oxygen attached to these elements, but also by technically ineffective impurities, e.g. alkali metal compounds, which have been incorporated into the catalyst in the course of its preparation. The catalysts to be used according to the invention may also contain, after their calcination, hydrogen in chemically bound form, e.g. in the form of OH groups or in the form of water of crystallization which cannot be removed even under calcination conditions.

The molar ratio of the support element(s), calculated as the sum of the relevant support elements, to the promoter element present in the catalyst or, cumulatively, to the promoter elements present in the catalyst, in each case calculated as the corresponding element, support element/promoter element, is generally from 50:50 to 99.9:0.1, preferably from 54:46 to 99.7:0.3, particularly preferably from 80:20 to 98:2. Alkali metals, which are usually present in the catalyst in the form of oxygen-containing alkali metal compounds, if at all, may be present in the catalyst as a result of its preparation in amounts of up to 1% by weight, e.g. from 0.1 to 1.0% by weight, in each case calculated as alkali metal. The alkali metals may be introduced into the catalyst, for example, by the use of alkali metal-containing precipitating agents or by alkali metal impurities or constituents of the promoter element compounds used for promotion or the precursor compounds used for preparing the support material.

The polymerization catalysts to be used according to the invention are generally and preferably halogen-free. However, depending on the manner of their preparation, in particular depending on the halogen content of the raw materials used for their preparation, these catalysts may be contaminated with halogen in amounts which are technically unavoidably introduced by these raw materials, but are technically inefficient and neither exhibit a promoter effect nor lead to the formation of halogenated polyisobutene. The reason for the technical inefficiency of such undesired halogen impurities in the catalysts to be used according to the invention is that these impurities are distributed unspecifically throughout the catalyst and do not form a part of the catalytically active centers. This is the difference between the catalysts to be used according to the invention and, among others, the halogen-containing catalysts according to U.S. Pat. No. 4,288,649 or U.S. Pat. No. 5,326,920, in which halogens are incorporated into the catalytically active centers of the catalyst in a controlled manner. The catalysts to be used according to the invention contain technically unavoidable halogen impurities in an amount of generally less than 1000 ppm by weight, preferably less than 100 ppm halogen by weight, in each case based on the total weight of the calcined catalyst, particular preference being given to using halogen-free catalysts.

Some of the catalysts to be used according to the invention are known, for example a few of the chromium on silicon dioxide catalysts described in EP-A 535 516 which to date have only been used in processes for the polymerization of ethylene.

Prior to use in the process according to the invention, the catalysts to be used according to the invention are advantageously conditioned, i.e. they are shaped to give shaped articles such as tablets, spheres, cylinders, rings or spirals or comminuted to spall in a conventional manner and preferably used in this form in a fixed bed in the reactor or milled to give a powder and used in this form, advantageously as suspension catalysts.

The catalysts to be used according to the invention can be stored over a virtually unlimited period of time, in particular with the exclusion of moisture. Catalysts which have become moist are advantageously dried under atmospheric pressure or reduced pressure, under atmospheric pressure in general at temperatures above 150° C., preferably at 180 to 300° C., under reduced pressure also at lower temperatures, prior to use.

The starter materials that may be used in the process of the invention are both pure isobutene and hydrocarbon mixtures comprising isobutene, such as $C_4$ raffinate or isobutane/isobutene mixtures derived from the dehydrogenation of isobutane. $C_4$ raffinate refers to hydrocarbon mixtures obtained by substantial removal of 1,3-butadiene, i.e. removal down to trace amounts, for example by extractive distillation, from the $C_4$ cut from steam crackers or fluid catalyzed crackers (cf. Weissermel, Arpe: Industrielle Organische Chemie, p. 69, 102–103, 2nd Ed., Verlag Chemie 1978).

The process of the invention can be carried out batchwise or continuously at generally from −30° C. to +40° C., preferably from −25 to +30° C., particularly preferably from −20° C. to +20° C., under atmospheric pressure or superatmospheric pressure, especially under the autogeneous pressure of the reaction system, so that the isobutene remains in liquid form. It is possible to use conventional reactors such as stirred reactors or loop reactors in batchwise operation of the process or loop reactors or reactor batteries in continuous operation of the process. It is also advantageous to use, in continuous operation of the process of the invention, tubular reactors or tubular reactor batteries operated in upflow or downflow mode. It is possible for the catalysts to be used according to the invention, preferably when using loop reactors or tubular reactors, to be arranged in a fixed bed or to be suspended in the reaction medium in powder form. The isobutene polymerization can be carried out with or without preferably a polar, halogen-free solvent, preferably hydrocarbons. When hydrocarbon mixtures comprising isobutene are used as starting material, the hydrocarbons which are present therein in addition to the isobutene act as solvents or diluents. Because of the exothermic nature of the isobutene polymerization, it may be advantageous to provide the reactors used with internal or external cooling means.

The desired average molecular weight $M_n$ of the polyisobutene can be adjusted by varying the reaction parameters in the process of the invention.

In the batch process, the average molecular weight $M_n$ is generally adjusted by variation of the amount of catalyst used, the reaction time and the reaction temperature. Depending on the amount of catalyst used, the reaction time is generally from 0.01 to 10 hours, preferably from 0.1 to 8 hours. In the discontinuous embodiment of the process of the invention, the catalyst is generally added in an amount of 0.1–50% by weight, preferably 0.5–20% by weight, particularly preferably 1–10% by weight, in each case based on the weight of the isobutene present in the starting material used. Depending on the catalyst and starting material used, the optimum polymerization conditions for the preparation of polyisobutene having a desired average molecular weight $M_n$ are advantageously determined in preliminary experiments. In continuous operation of the process of the invention, the average molecular weight $M_n$ is adjusted correspondingly, but here the reaction parameters of space velocity and residence time are varied instead of the amount of catalyst used.

The isolation of the polyisobutene from the polymerization mixture generally does not include any special technical features and may be effected by distillation, which, when a suspended catalyst is used, is preceded by the removal of the suspended catalyst, for example by filtration, centrifugation or decanting. The distillation advantageously initially removes from the polyisobutene volatile components of the polymerization mixture such as unconverted isobutene, hydrocarbons present in the starting material or added as solvents and then higher-boiling byproducts, for example low molecular weight isobutene oligomers.

The process of the invention provides an economical way to prepare reactive, halogen-free polyisobutene having an average molecular weight $M_n$ of generally 280–10000 dalton, preferably 400–6000 dalton, particularly preferably 500–5000 dalton, and a terminal double bond content of more than 50 mol %.

EXAMPLES

I. Catalyst Preparation

Catalysts A–L were prepared and used in powder form.

The Mo, W, Si, Pb, La, Fe and V contents of each catalyst were determined by X-ray fluorescence analysis (Lit. R. Bock: Methoden der Analytischen Chemie; Vol. 2: Nachweis- und Bestimmungsmethoden Teile 1, Verlag Chemie, Weinheim 1980), the B, Cr and Ti contents of each catalyst were determined by ICP (Inductively Coupled Plasma)-atom emission spectroscopy (Lit. A. Montaser; D. W. Golightly: Inductively Coupled Plasmas in Analytical Atomic Spectrometry; 2nd Ed., VCH Verlagsgesellschaft, Weinheim), the Cl and S contents of each catalyst were determined by the Schbniger method and by combustion analysis (Lit.: F. Ehrenberger: Quantitative organische Elementaranalyse; VCH Verlagsgesellschaft, Weinheim 1991). Prior to the analysis for these elements, the calcined catalysts were again dried until a constant weight was obtained and immediately analyzed in this form.

Catalyst A: 50 g of ammonium heptamolybdate tetrahydrate $((NH_4)_6Mo_7O_{24} \cdot 4H_2O)$ was calcined in air at 500° C. for 5 h. After calcination, the catalyst had an Mo content of 66.0% by weight.

Catalyst B: 50 g of $SiO_2$ (Aerosile 200 from Degussa, Hanau) were placed in a 1 l flask and mixed with a solution consisting of 51.42 g of ammonium heptamolybdate tetrahydrate $((NH_4)_6Mo_7O_{24} \cdot 4H_2O)$ and 700 ml of water. The suspension was rotated on a rotary evaporator for 30 min. Excess water was then removed at 60° C. The resulting material was predried at 150° C. for 16 h and calcined in air at 500° C. for 16 h. After calcination, the catalyst had the following Mo and Si contents:

Mo: 26.0% by weight

Si: 28.5% by weight

Catalyst C: A mixture of 39 g of $(NH_4)_6Mo_7O_{24} \cdot 4H_2O$ in 100 g of water and 142 g of FeOOH was kneaded for 90 min and then dried at 120° C. for 12 h. The material was then milled and then calcined at 500° C. for 2 h. After calcination, the catalyst had the following Mo and Fe contents:

Mo: 13.6% by weight

Fe: 54.0% by weight

Catalyst D: 50 g of $Pb(NO_3)_2$ were placed in a 1 l flask and mixed with a solution consisting of 37.31 g $(NH_4)_6Mo_7O_{24} \cdot 4H_2O$ and 250 ml of water. The suspension was rotated on a rotary evaporator for 30 min. Excessive water was then removed at 60° C. The resulting material was predried at 150° C. for 16 h and calcined in air at 500° C. for 16 h. After calcination, the catalyst had the following Mo and Pb contents:

Mo: 31.5% by weight

Pb: 49.0% by weight

Catalyst E: 88.3 g of a $(NO_3)_3 \cdot 6H_2O$ were placed in a 1 l flask and mixed with a solution consisting of 12.6 g of $(NH_4)_6Mo_7O_{24} \cdot 4H_2O$ and 400 ml of water. The suspension was rotated on a rotary evaporator for 30 min. Excess water was then removed at 60° C. The resulting material was predried at 150° C. for 16 h and calcined in air at 500° C. for 16 h. After calcination, the catalyst had the following Mo and La contents:

Mo: 17.7% by weight

La: 47.5% by weight

Catalyst F: 50 g of boric acid were placed in a 1 l flask and mixed with a solution consisting of 199.88 g of ammonium heptamolybdate tetrahydrate $((NH_4)_6Mo_7O_{24} \cdot 4H_2O)$ and 600 ml of water. The suspension was rotated on a rotary evaporator for 30 min. The material was then predried and calcined in air at 500° C. for 16 h. After calcination, the catalyst had the following Mo and B contents:

Mo: 55.0% by weight

B: 4.1% by weight

Catalyst G: 50 g of iron (II) sulfate heptahydrate were placed in a 1 l flask and mixed with a solution consisting of 2.83 g of $VCl_3$ and 250 ml of water. The solution was rotated on a rotary evaporator for 30 min. Excess water was then removed at 60° C. The resulting material was predried at 150° C. for 16 h and calcined in air at 500° C. for 16 h. After calcination, the catalyst had the following Fe, V, Cl and S contents:

Fe: 29.8% by weight

V: 5.4% by weight

Cl: 0.001% by weight

S: 16.0% by weight

Catalyst H: A mixture of 20 g of tungstic acid $(H_2WO_4)$ in 80 g of 32% strength $NH_3$ solution was kneaded together with 84 g of FeOOH for 90 min. and then dried at 120° C. for 12 h. The material was milled and calcined at 300° C. for 2 h. After calcination, the catalyst had the following W and Fe contents:

W: 15.5% by weight

Fe: 56.0% by weight

Catalyst I: 150 g of titanium dioxide were kneaded together with 37.5 g of $CrO_2$ in 160 g of water for 120 min. and then dried at 120° C. for 12 h. The material was milled and then calcined first at 350° C. for 2 h and then at 650° C. for 2 h. After calcination, the catalyst had the following Cr and Ti contents:

Cr: 13.2% by weight

Ti: 46.0% by weight

Catalyst J: 120 g of $Ti(OH)_4$ were homogenized together with 16.8 g of molybdic acid $H_2MoO_4$ and 100 ml of water in a kneader, dried at 100° C. and calcined in air at 500° C. for 5 h. After calcination, the catalyst contained:

Mo: 10.0% by weight

Ti: 51.0% by weight

Catalyst K: 120 g of Ti(OH)$_4$ were homogenized together with 15.3 g of H$_2$WO$_4$ and 100 ml of water in a kneader, dried at 110° C. and calcined in air at 700° C. for 5 h. After calcination, the catalyst contained:

W: 12.0% by weight

Ti: 51.0% by weight

Catalyst L:

120 g of Ti(OH)$_4$ were homogenized together with 94.1 g of aqueous vanadium oxalate solution (V content: 5 mol % calculated as V$_2$O$_5$) and 20 ml of water in a kneader, dried at 110° C. and calcined at 500° C. for 5 h. After calcination, the catalyst had the following Ti and V contents:

Ti: 52.0% by weight

V: 7.7% by weight

II. Polymerization of Isobutene

The number average molecular weight $M_n$ which is also referred to herein as average molecular weight $M_n$ was determined by gel permeation chromatography (GPC) using standardized polyisobutenes for calibration. The number average molecular weight $M_n$ was calculated from the GPC chromatograms obtained using the equation $$M_n = \Sigma c_i / \Sigma (c_i / M_i)$$

where $c_i$ is the concentration of the individual polymer species in the resulting polymer mixture and $M_i$ is the molecular weight of the individual polymer species i. The molecular weight distribution, also called dispersity (D), was calculated from the ratio of the average molecular weight ($M_w$) and number average molecular weight ($M_n$) using the equation $$D = M_w / M_w / M_n$$

where the weight average molecular weight M. was determined from the GPC chromatograms obtained using the equation:

$$M_w = \Sigma c_i M_i / \Sigma c_i$$

The α- and β-olefin contents (Formula I and II) were determined by $^{13}$C-NMR spectroscopy.

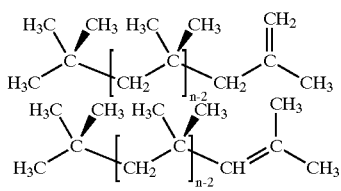

In the $^{13}$C-NMR spectrum, the C atoms of the terminal double bond of the α-olefins I show peaks at a chemical shift of 114.4 ppm (CH$_2$) and 143.6 ppm (C), whereas the signals of the C atoms of the trisubstituted double bond of the β-olefins II are at 127.9 (=CH-R) and 135.4 ppm (=C(CH$_3$)$_2$). The α- and β-olefin contents can be determined by evaluation of the peak areas and by comparison with the peak areas of the other olefinic C atoms. Deuterated chloroform (CDCl$_3$) was used as solvent and tetramethylsilane was used as internal standard.

Example 1

10 g of isobutene were condensed into a 25 ml glass pressure vessel under argon at −70° C. 1 g of catalyst A which had been predried at 180° C./0.3 mbar was added, the vessel was sealed and the suspension was stirred at 0° C. for 2 h under the autogeneous pressure of the reaction system. The polymerization mixture was then diluted with 10 g of n-hexane at 0° C. Unconverted isobutene was evaporated at room temperature, the catalyst was filtered off and the solvent added was removed from the filtrate by distillation at room temperature, slowly reducing the pressure to 0.3 mbar. Low molecular weight isobutene oligomers were removed from the resulting polyisobutene by Kugelrohr distillation at 120° C./0.3 mbar. The colourless polyisobutene which was obtained in a yield of 11% had an average molecular weight $M_n$ of 3640 dalton, a molecular weight distribution D of 3.4 and a terminal double bond content (=α-olefin content) of 75 mol %. The β-olefin content was 26 mol %.

Examples 2 to 12

Examples 2 to 12 were carried out as described in Example 1. Table 1 summarizes the results of these batch-wise runs obtained using the various catalysts and different amounts of catalysts.

Table 1: Batch polymerization of isobutene polymerization conditions: polymerization temperature: 0° C.; Autogeneous pressure; polymerization time: 2 h; amount used: 10 g of isobutene

| Ex. No. | Catalyst | Amount of catalyst [g] | Yield [1] [%] | S (I) [2] [mol %] | S (I + II) [3] [mol %] | $M_n$ | D |
|---|---|---|---|---|---|---|---|
| 2 | B | 0.6 | 13 | 76 | 86 | 2231 | 3.6 |
| 3 | C | 2.0 | 8 | 74 | 87 | 447 | 1.3 |
| 4 | D | 1.0 | 18 | 73 | 94 | 4246 | 2.2 |
| 5 | E | 1.0 | 3 | 65 | 85 | 5110 | 8.4 |
| 6 | F | 1.0 | 10 | 56 | 82 | 5294 | 2.5 |
| 7 | G | 1.4 | 5 | 78 | 91 | 1073 | 1.6 |
| 8 | H | 1.0 | 14 | 67 | 80 | 450 | 3.9 |
| 9 | I | 1.5 | 5 | 51 | 76 | 706 | 6.1 |
| 10 | J | 0.2 | 12 | 73 | 80 | 625 | 2.5 |
| 11 | K | 0.2 | 13 | 78 | 86 | 884 | 5.7 |
| 12 | L | 0.5 | 8 | 83 | 90 | 1126 | 4.6 |

[1] Evaporation residue after Kugelrohr distillation (120° C./0.3 mbar), based on isobutene used
[2] S (I) = Terminal double bond content = α-olefin content
[3] S (I + II) = Terminal double bond content + β-olefinic double bond content.

We claim:

1. A process for preparing a halogen-free, reactive polyisobutene having a terminal double bond content of more than 50 mol % and an average molecular weight $M_n$ of 280–10000 dalton which comprises:

carrying out a cationic polymerization of isobutene in a liquid phase consisting essentially of isobutene or mixtures thereof with a liquid hydrocarbon at a temperature of from −30° C. to 40° C. in the presence of at least one heterogeneous polymerization catalyst which is substantially free of halogen and is selected from the group consisting of the oxides of the transition elements of Groups V and VI of the Periodic Table of Elements, said catalyst being unsupported or optionally supported on one or more compounds which are non-zeolitic oxides of at least one metal selected from the group consisting of the elements of the main Groups II, III and IV and also the transition metals of Groups I, II, III, IV, VII and VIII of the Periodic Table of Elements, but excluding all oxygen-containing zirconium compounds.

2. A process as claimed in claim 1, wherein the catalyst is carried on at least one oxidic support.

3. A process as claimed in claim 2, wherein the catalyst is supported on a carrier selected from the group consisting of the oxides of silicon, titanium, iron, boron, lanthanum, lead or mixtures thereof.

4. A process as claimed in claim 2, wherein the catalyst is supported on a carrier selected from the group consisting of the oxides of silicon, titanium and iron or mixtures thereof.

5. A process as claimed in claim 4, wherein the catalyst consists of molybdenum, titanium or mixtures thereof.

6. A process as claimed in claim 1, wherein the catalyst consists essentially of an unsupported metal oxide selected from the group consisting of the oxides of vanadium, chromium, molybdenum and tungsten and mixtures thereof.

7. Of A process as claimed in claim 6, wherein the catalyst is selected from the group consisting of the oxides of molybdenum, tungsten and mixtures thereof.

* * * * *